(12) United States Patent
Crespi et al.

(10) Patent No.: US 7,853,741 B2
(45) Date of Patent: *Dec. 14, 2010

(54) TUNNELING SATA TARGETS THROUGH FIBRE CHANNEL

(75) Inventors: David Andrew Crespi, Costa Mesa, CA (US); Carl Joseph Mies, Costa Mesa, CA (US); Bruce Gregory Warren, Costa Mesa, CA (US); Gary Lynn Franco, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1238 days.

This patent is subject to a terminal disclaimer.

(21) Appl. No.: 11/104,230

(22) Filed: Apr. 11, 2005

(65) Prior Publication Data

US 2006/0242312 A1    Oct. 26, 2006

(51) Int. Cl.
*G06F 3/00* (2006.01)
(52) U.S. Cl. .................. 710/65; 710/5; 710/30
(58) Field of Classification Search .......... 709/203, 709/217, 227, 229, 230, 245, 246, 250; 710/240, 710/250, 260, 311, 33, 36
See application file for complete search history.

(56) References Cited

U.S. PATENT DOCUMENTS

| | | | |
|---|---|---|---|
| 6,425,034 B1 | 7/2002 | Steinmetz | |
| 6,643,693 B1 * | 11/2003 | Reynolds et al. | 709/223 |
| 6,683,883 B1 * | 1/2004 | Czeiger et al. | 370/401 |
| 6,732,104 B1 | 5/2004 | Weber | |
| 6,763,419 B2 * | 7/2004 | Hoese et al. | 710/11 |
| 6,970,974 B2 * | 11/2005 | Isobe et al. | 711/114 |
| 7,051,147 B2 * | 5/2006 | Hoese et al. | 710/305 |
| 7,103,686 B1 | 9/2006 | Lin | |
| 7,111,087 B2 * | 9/2006 | Jiang et al. | 710/36 |
| 7,120,705 B2 | 10/2006 | Arai | |

(Continued)

FOREIGN PATENT DOCUMENTS

WO    WO-2006/110844 A2    10/2006

(Continued)

OTHER PUBLICATIONS

Thornburgh, Fibre Channel for Mass Storage, Apr. 1999, Prentice Hall, pp. 1-155.

(Continued)

*Primary Examiner*—Cheng-Yuan Tseng
(74) *Attorney, Agent, or Firm*—Morrison & Foerster LLP

(57) ABSTRACT

A system for enabling SATA drives to be utilized in FC SANs is disclosed. To send SATA FISs to a SATA drive over a FC SAN, a host sends SCSI commands encapsulated in FC frames over a standard FC link to a Fiber Channel Attached SATA Tunneling (FAST) RAID controller, where the SCSI commands are de-encapsulated from the FC frames and translated to SATA FISs. The SATA FISs are thereafter encapsulated into FC frames. The IOC that performs these functions is referred to as a FAST IOC. The SATA-encapsulated FC frames are sent to multiple disk drive enclosures over another standard FC link. The FC frames are de-encapsulated by FAST switches in disk drive enclosures to retrieve the SATA FISs, and the SATA FISs are sent to the SATA drives over a SATA connection.

12 Claims, 14 Drawing Sheets

U.S. PATENT DOCUMENTS

| | | | |
|---|---|---|---|
| 7,155,546 B2* | 12/2006 | Seto | 710/100 |
| 7,167,929 B2* | 1/2007 | Steinmetz et al. | 710/5 |
| 7,206,875 B2* | 4/2007 | Marushak et al. | 710/62 |
| 7,234,023 B2* | 6/2007 | Abe et al. | 711/114 |
| 7,308,534 B2* | 12/2007 | Mimatsu | 711/114 |
| 7,310,696 B1* | 12/2007 | Haechten et al. | 710/311 |
| 7,328,392 B2* | 2/2008 | Chikusa et al. | 714/770 |
| 7,330,950 B2* | 2/2008 | Matsunami et al. | 711/165 |
| 7,330,999 B2* | 2/2008 | Davies et al. | 714/9 |
| 7,350,022 B2* | 3/2008 | Mizuno et al. | 711/112 |
| 7,353,321 B2* | 4/2008 | Steinmetz et al. | 711/100 |
| 7,360,010 B2* | 4/2008 | Ghaffari et al. | 710/316 |
| 7,370,128 B2* | 5/2008 | Douglas et al. | 710/74 |
| 7,370,139 B2* | 5/2008 | Bashford et al. | 711/104 |
| 7,392,333 B2* | 6/2008 | Chiu | 710/62 |
| 7,412,573 B2* | 8/2008 | Uratani et al. | 711/154 |
| 7,423,354 B2* | 9/2008 | Suzuki et al. | 307/28 |
| 7,447,233 B2* | 11/2008 | Narad et al. | 370/473 |
| 7,500,047 B1* | 3/2009 | Tyndall et al. | 710/315 |
| 7,506,078 B2* | 3/2009 | Wootten et al. | 710/15 |
| 7,516,272 B2* | 4/2009 | Felton et al. | 711/112 |
| 7,523,235 B2* | 4/2009 | Nemazie et al. | 710/74 |
| 7,523,236 B1* | 4/2009 | Nemazie et al. | 710/74 |
| 7,523,258 B2* | 4/2009 | Suzuki et al. | 711/114 |
| 7,526,587 B2* | 4/2009 | Nemazie et al. | 710/74 |
| 7,565,566 B2* | 7/2009 | Davies et al. | 714/4 |
| 7,568,056 B2* | 7/2009 | Danilak | 710/36 |
| 7,634,614 B2* | 12/2009 | Steinmetz et al. | 711/112 |
| 7,685,335 B2* | 3/2010 | Arndt et al. | 710/56 |
| 7,689,744 B1* | 3/2010 | McCarty et al. | 710/74 |
| 7,711,805 B1* | 5/2010 | Dale | 709/223 |
| 7,711,871 B1* | 5/2010 | Haechten et al. | 710/29 |
| 2002/0144046 A1* | 10/2002 | Hooper, III | 710/316 |
| 2004/0010545 A1* | 1/2004 | Pandya | 709/203 |
| 2004/0010612 A1* | 1/2004 | Pandya | 709/230 |
| 2004/0148460 A1 | 7/2004 | Steinmetz et al. | |
| 2004/0158669 A1* | 8/2004 | Weng et al. | 711/103 |
| 2004/0205288 A1 | 10/2004 | Ghaffari et al. | |
| 2005/0060538 A1 | 3/2005 | Beverly | |
| 2005/0102468 A1 | 5/2005 | Delaney et al. | |
| 2005/0102479 A1* | 5/2005 | Innan et al. | 711/162 |
| 2005/0144490 A1* | 6/2005 | Igari | 713/300 |
| 2005/0289262 A1* | 12/2005 | Sutardja | 710/74 |
| 2006/0168371 A1* | 7/2006 | Chiu | 710/62 |
| 2006/0242312 A1 | 10/2006 | Crespi | |

FOREIGN PATENT DOCUMENTS

WO    WO-2006/110844 A3    10/2006

OTHER PUBLICATIONS

International Search Report mailed Feb. 13, 2008, for PCT Application No. PCT/US06/13715, two pages.

\* cited by examiner

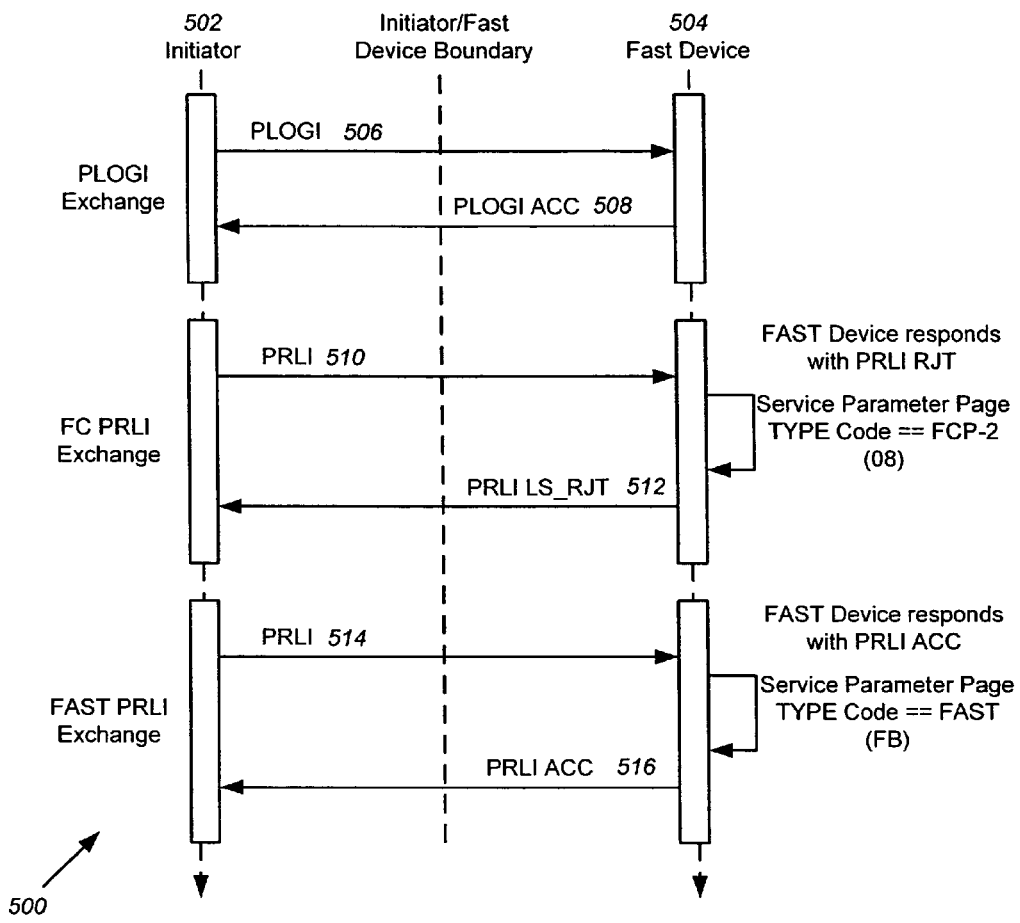

PRLI Contents

| | |
|---|---|
| TYPE Code: | FAST |
| TYPE Code Extension: | 0 |
| Orig Process_Assoc Validity: | 0 |
| Resp Process_Assoc Validity: | 0 |
| Establish Image Pair: | XXXX |
| Originator Process_Associator: | 0 |
| Responder Process_Associator: | 0 |
| Initiator Function: | XXXX |
| Target Function: | XXXX |

FAST = Vendor Specific TYPE Value (E0-FF)
XXXX = As defined in FC-FS and FCP-2

NOTE: FAST capable Initiator must complete PLOG/PRLI ELS sequence successfully before being allowed to communicate with the FAST Device.

PRLI ACC Contents

| | |
|---|---|
| TYPE Code: | FAST |
| TYPE Code Extension: | 0 |
| Orig Process_Assoc Validity: | 0 |
| Resp Process_Assoc Validity: | 0 |
| Establish Image Pair: | XXXX |
| Accept Response Code: | XXXX |
| Originator Process_Associator: | 0 |
| Responder Process_Associator: | 0 |
| Initiator Function: | XXXX |
| Target Function: | XXXX |

FAST = Vendor Specific TYPE Value (E0-FF)
XXXX = As defined in FC-FS and FCP-2

FIG. 5

TUNNELING SATA TARGETS THROUGH FIBRE CHANNEL

FIELD OF THE INVENTION

This invention relates to communications over Storage Area Networks (SANs), and more particularly, to the encapsulating of Serial Advanced Technology Attachment (SATA) Frame Information Structures (FISs) into Fibre Channel (FC) frames for transmission over FC SANs that utilize SATA disk drives.

BACKGROUND OF THE INVENTION

Conventional FC SANs. FC is a serial transport protocol that was developed for carrying other transport protocols. In conventional SANs, FC carries Small Computer System Interconnect (SCSI), which is a parallel protocol. In other words, parallel SCSI commands are encapsulated within FC frames and transported over FC links in FC SANs.

FIG. 1 illustrates an exemplary conventional SAN 100 which includes one or more hosts 102 connected to two Redundant Array of Independent Disks (RAID) controllers 104 over a network 106. The host side of the RAID controllers 104 is referred to as the "front end" 112. In conventional SANs 100, the RAID controllers 104 are connected to a plurality (e.g. 30 to 100) of drives in disk drive enclosures 108 and send and receive FC frames over a FC link 110. The disk drive enclosure side of the RAID controllers 104 is referred to as the "back end" 114. In conventional SANs 100, the disk drives within the disk drive enclosures are FC drives 118 that operate according to the SCSI protocol.

FC-ATA SANs. FC drives offer the best performance, but are expensive. Therefore, less expensive (but lower performance) Advanced Technology Attachment (ATA) drives of the type commonly used in desktop or notebook computers have been used in place of FC drives, or along with FC drives in what is referred to as tiered storage. The ATA drives may be Parallel Advanced Technology Attachment (PATA) or Serial Advanced Technology Attachment (SATA) drives. FIG. I illustrates a SAN in which one of the disk drive enclosures 108 contain PATA drives 120 rather than FC drives. PATA drives require a FC-to-PATA bridge 116, which is relatively expensive and effectively makes the PATA disk drives 120 appear as SCSI drives to the RAID controller 104. In other words, the RAID controllers 104 send FC encapsulated SCSI commands to the disk drive enclosures, and receive FC encapsulated SCSI commands from the disk drive enclosures, and the conversion between FC and PATA occurs in the bridge 116, transparent to the RAID controllers 104 and the rest of the SAN 100. Because PATA drives are different from FC drives in terms of interfaces, error recovery and discovery, FC-to-PATA bridges are designed to be specific to a particular type of PATA drive. As a consequence, every time a new PATA drive is developed, the FC-to-PATA bridge may require modification.

In disk drive technology, as well as in transport technology, there are speed and cable distance benefits to utilizing serial protocols rather than parallel protocols. SATA drives, the serial counterpart to PATA drives, are therefore now being contemplated as an upgrade to PATA. SATA was envisioned for consumer applications.

SAS-SATA SANs. FC, as described above, is a serial transport protocol that has historically been used for carrying the SCSI protocol in enterprise applications over large connectivity spaces. Serial Attached SCSI (SAS) is a relatively new serial protocol intended to replace parallel SCSI within an enterprise host or computer. Both FC and SAS use 8b10b encoding and similar ordered sets, and both are high performance and expensive. SAS includes several protocols. One such protocol is the Simple Management Protocol (SMP), a protocol for device-to-device management that enables each entity to communicate with other entities regarding management aspects.

To take advantage of lower cost SATA drives, SATA drives have been utilized alongside higher cost, higher performance SAS drives in SAS networks (a SAS network including the initiator, target, and any attached expander devices). As mentioned above, tiered storage is the concept of having different types of drives in the same network (e.g. some 73 GByte FC drives and some 200-500 GByte SATA drives), each for a different purpose. FIG. 2 illustrates a SAS SAN incorporating tiered storage, where SATA drives are utilized in addition to SAS drives. As illustrated in FIG. 2, within a host 200, a motherboard (MB) 202 includes a processor 204, an embedded SAS Input/Output Controller (IOC) 206, and a SAS expander 208 to provide multiple ports to the MB 202 and multiple connections to drives. Connected to the host 200 are SAS drives 210 and SATA drives 212 within the host 200. In addition, the host 200 is connected to enclosures 214 containing both SAS and SATA drives. To accommodate tiered storage, another protocol was developed within SAS, the SATA Tunneling Protocol (STP), which enables lower cost SATA drives to be employed in SAS systems.

Unlike FC, which is a loop technology where drives share a common infrastructure, SAS is a point-to-point technology. SAS employs a shared infrastructure with the ability to create a point-to-point connection between two devices through which data may be transferred without interruption. Similar to FC, SAS goes through a discovery process where the first SAS entity that is discovered is the SAS expander 208. The number of ports in the SAS expander 208 is also discovered. Each port is then discovered in turn by the initiator, and the device connected to each port is determined (e.g. a SAS device). For example, if a SAS discovery ordered set is sent to a SAS drive, the SAS drive returns an affirmative response indicating that it is a SAS drive. However, if the SAS ordered set is sent to a SATA drive, nothing is returned. Similarly, if a SATA discovery ordered set is sent to a SATA drive, the SATA drive returns an affirmative response, indicating that it is a SATA drive. From that point forward, the initiator communicates with the device as a SATA device.

In the simplified ladder diagram of FIG. 2 showing a half-duplex operation, SAS ordered sets are sent between the initiator 200 and the enclosure expander. The enclosure expander makes a connection between the initiator 200 and the correct target. Once the connection is created, SATA ordered sets 216 flow between a host or initiator 200 and a target 218. The SAS communications effectively build a point-to-point connection between the SAS IOC 206 and a target (e.g. SATA drive 212), and thereafter SATA ordered sets are passed across this connection that are natively understood by the SATA drive 212. Intermixed with the SATA ordered sets will be SATA File Information Structures (FISs) flowing from the initiator 200 to the target 218 (see reference character 220), and from the target 218 to the initiator 200 (see reference character 222) according to STP.

Because of the reliability, speed and cable distance benefits inherent in FC, and the lower cost of SATA drives, there is a need to utilize SATA drives in FC SANs that have historically utilized SCSI drives. Conventional solutions for utilizing SATA drives in FC SANs provide a conversion interface, or bridge, between the FC link and the SATA device. These conversion interfaces terminate all FC exchanges and initiate corresponding SATA exchanges at or near the targets. These bridging solutions require a bridge unit per SATA device or a bridge per SATA enclosure and as a result become a prohibitively expensive solution in a SAN environment. In addition, all error cases must be dealt with at or near the drive level. In the other direction, SATA exchanges are also terminated and FC exchanges are created and sent to the FC initiator. Because the FC to SATA translation is performed independently at each SATA drive or enclosure, there is no clean way of performing this conversion and the approach is prone to performance and interoperability issues. Error recovery in FC is also much different than SATA. The interface must now deal with the differences, which adds complexity and additional cost to the system.

Therefore, there is a need to be able to utilize SATA drives while preserving the FC infrastructure and FC transport to the greatest extent possible to minimize the changes needed to legacy FC SANs. There is a further need to move the translation and protocol handling into the RAID controllers, which is a much more cost effective solution because the RAID controllers can perform the protocol translation for a large number of drives.

SUMMARY OF THE INVENTION

Embodiments of the present invention are directed to enabling SATA drives to be utilized in FC SANs. As mentioned above, SATA drives are also now being contemplated as an upgrade to PATA in FC SANs. FC remains advantageous as a transport protocol because it can be transmitted over long distances (thousands of meters) compared to SATA (one meter), and 126 drives can be addressed per FC loop or greater than 16 million drives in FC fabrics. Therefore, to send data to a SATA drive over a FC SAN, a host sends SCSI commands encapsulated in FC frames over a standard FC link to a Fibre Channel Attached SATA Tunneling (FAST) enabled RAID controller, where the SCSI commands are de-encapsulated from the FC frames and translated to SATA FISs. The SATA FISs are then encapsulated into FC frames. The IOC that performs these functions is referred to as a FAST IOC. The SATA-encapsulated FC frames are sent to multiple disk drive enclosures over another standard FC link. The FC frames are then de-encapsulated by FAST switches in disk drive enclosures to retrieve the SATA FISs. SATA FISs are up to 8k bytes in size and FC Frames payloads are a maximum or 2k bytes. Since a SATA FIS can be larger than the maximum FC frame size, multiple frames are used to send SATA FISs as required. On the FAST switches the multiple frames are received and the SATA FIS is reconstructed and the SATA FISs are sent to the SATA drives over a SATA connection. The sequence count of each frame is incremented sequentially to identify SATA devices that are FAST-enabled by the FAST switches are referred to herein as FAST devices.

The only elements in the FC SAN which require modification to support the FAST protocol are the FAST IOC and FAST switch. Existing investments in drivers and FC infrastructure can be preserved, although in alternative embodiments the FAST IOC functionality could be implemented in the IOC's drivers. The existing FC infrastructure can remain unmodified while new SATA connect capabilities are added to the SAN.

BRIEF DESCRIPTION OF THE DRAWINGS

FIG. 5 is an exemplary illustration of a discovery sequence between a FAST-compatible initiator and a FAST device according to embodiments of the present invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
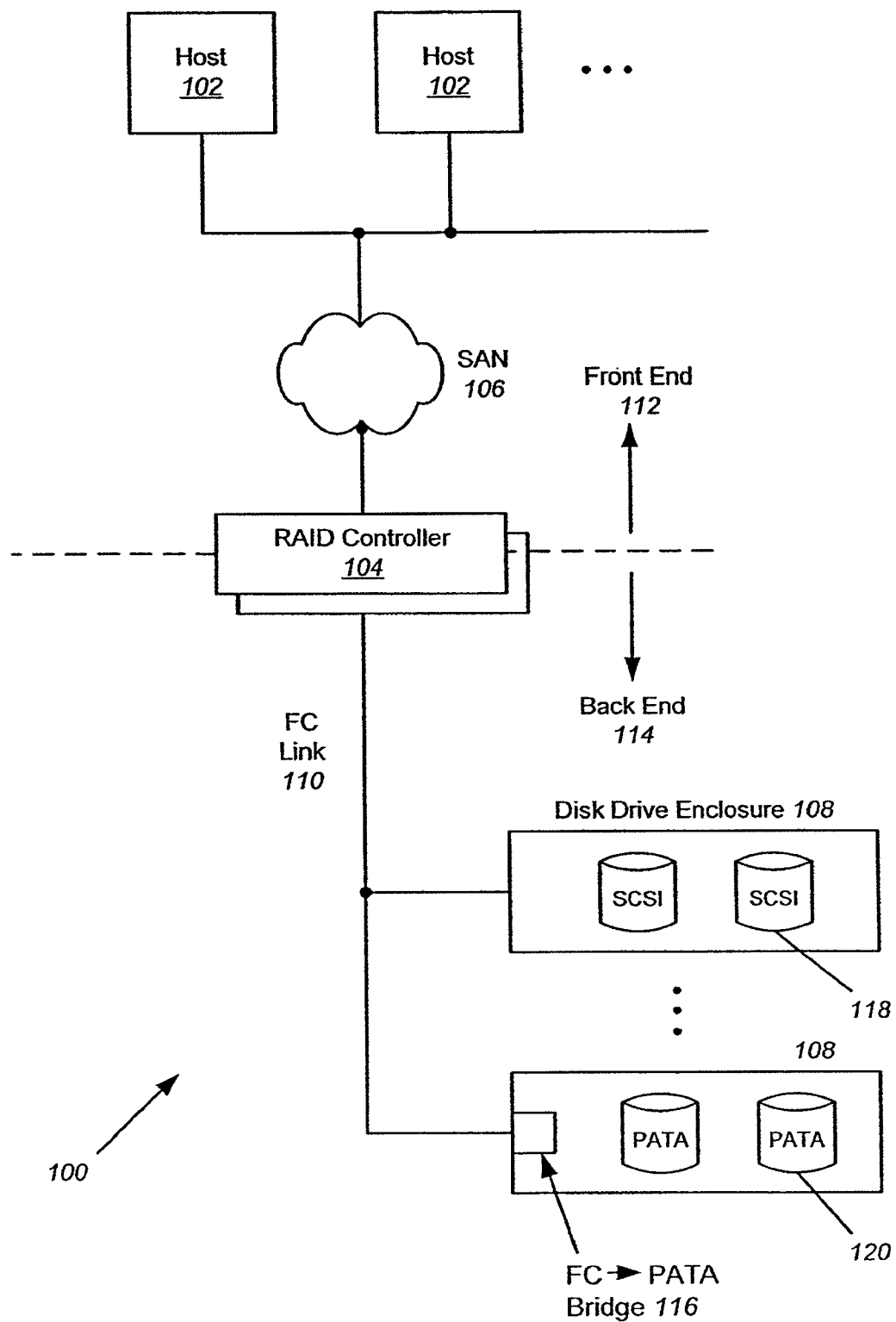
FIG. 1 is an exemplary illustration of a SAN including one or more hosts connected to two RAID controllers and two disk drive enclosures over a network, with one of the enclosures including a FC-to-PATA bridge.
Figure 2:
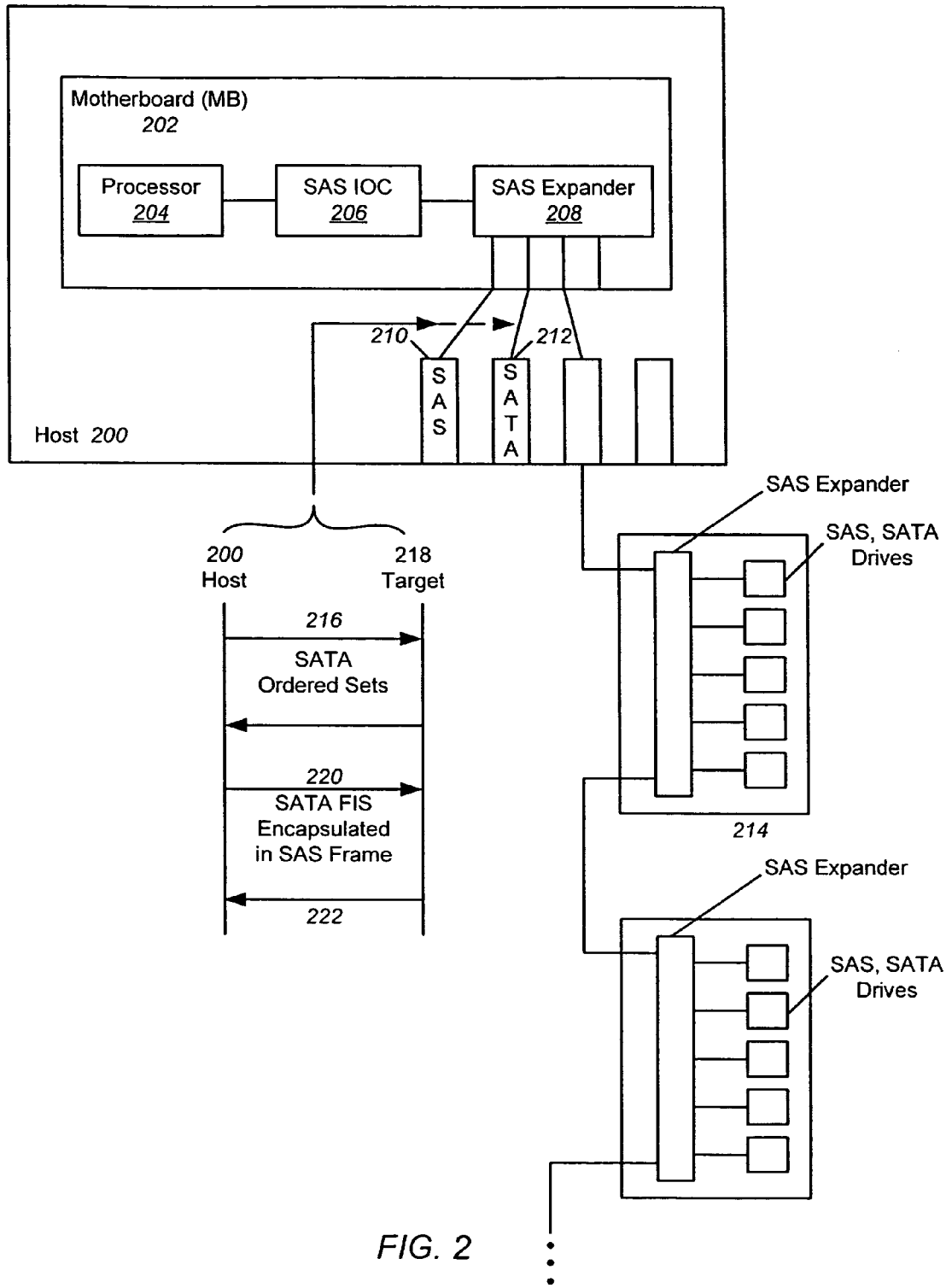
FIG. 2 is an exemplary illustration of a SAS network within a host incorporating tiered storage, where SATA drives are utilized in addition to SAS drives.
Figure 3:
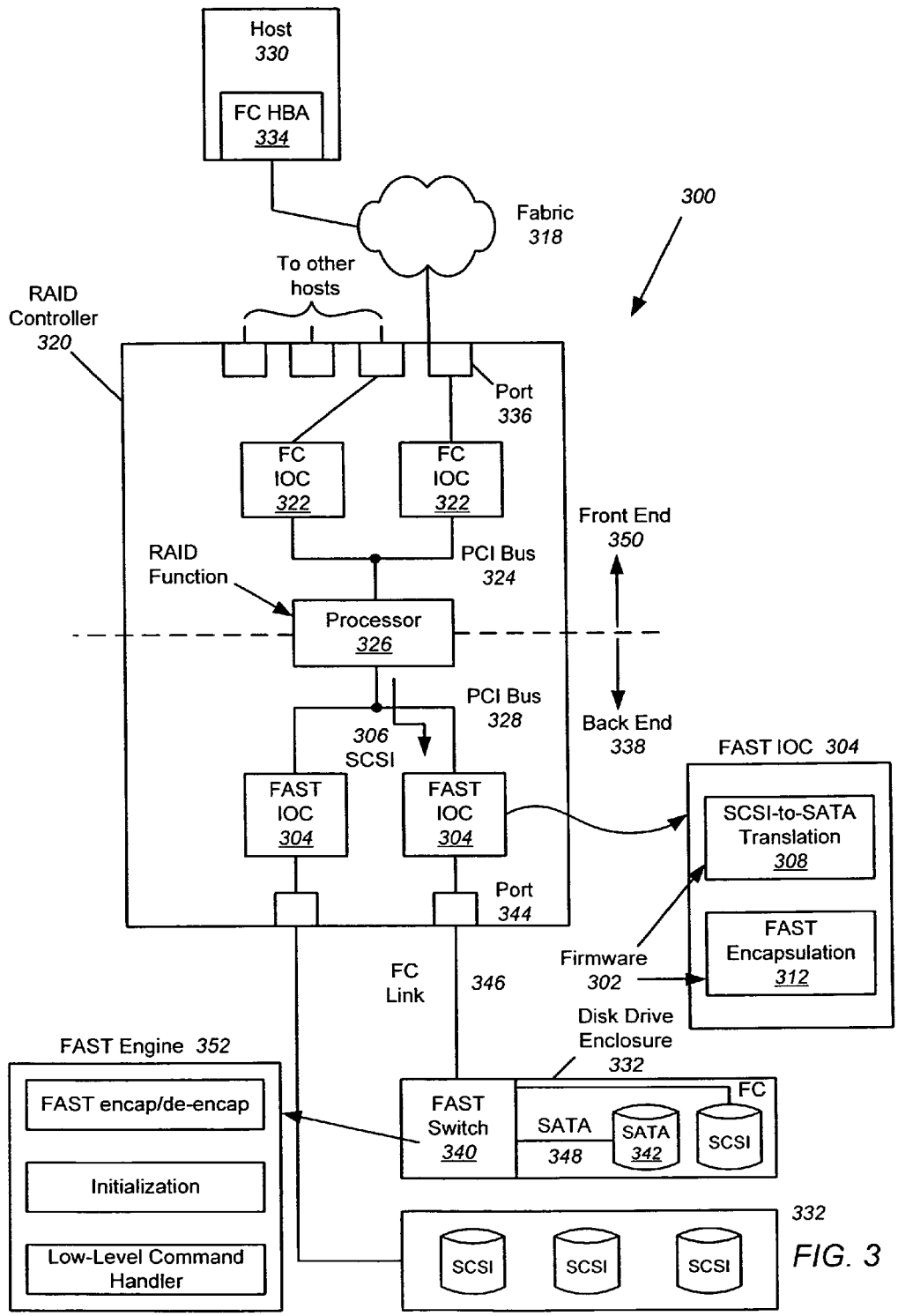
FIG. 3 is an exemplary illustration of a SAN including a host, a RAID controller including a FAST IOC, and a disk drive enclosure containing SATA drives and a FAST switch according to embodiments of the present invention.

FC-SATA SANs. FIG. 3 illustrates a SAN 300 including SATA drives and a conversion from FC to SATA according to embodiments of the present invention. When SCSI commands are to be sent from host 330 to SATA drives 342 in disk drive enclosure 332, a FC HBA 334 in host 330 sends FC frames encapsulating the SCSI commands out over the fabric 318 to a RAID controller 320, where they are received in one of the ports 336 on the RAID controller 320. Note that the ports 336 may also be connected to other hosts in the SAN 300. Note also that in alternative embodiments, a RAID controller need not be employed, but any device providing an IOC function may be utilized. The FC frames are then routed to FC IOCs 322 in the RAID controller 320. The SCSI commands within the FC frames are then de-encapsulated by the FC IOCs 322 and passed over a Peripheral Component Interconnect (PCI) bus 324 to a processor 326, which performs the RAID function and creates multiple commands to satisfy the received SCSI command. The created commands may be SCSI commands or SATA commands and will be sent to one or more disk drives within enclosures 332.

The SCSI commands 306 are then passed from the processor 326 over a custom interface 328 (which may include, but is not limited to a PCI bus) to FAST-enabled IOCs 304. The FAST IOCs 304 contain the same hardware as conventional FC IOCs, but include additional firmware 302 to allow it to handle both FC and SATA according to embodiments of the present invention. SCSI commands 306 from processor 326 are converted in SCSI-to-SATA translation firmware 308 to SATA FISs. In alternative embodiments, the SCSI-to-SATA translation may be performed by the processor 326 rather than in the FAST IOC 304. The SATA FISs are then encapsulated by FAST encapsulation firmware 312 into FC frames. In particular, each 8 kByte SATA FIS is encapsulated into four 2 kByte FC frames along with modifications to the header in the FC frames that enable the SATA-encapsulated FC frames to traverse a FC link. The FAST IOC 304 then sends the FC frames out over a FC link 346 via a FC port 344.

The FC frames are received by FAST switches 340 in disk drive enclosures 332, which are utilized instead of FC-to-SATA bridges. Because FC-to-SATA bridges are no longer required, the problem of new SATA drive types requiring reworking the FC-to-SATA bridge disappears. The drives can be presented as pure ATA throughout the SAN, while using FC as the transport. The FAST switches 340 include a FAST engine 352, which de-encapsulates the FC frames to retrieve the SATA FISs, handles initialization, sequences, exchanges, and all of the low-level FC commands and structures. Note that conventional FC switches only route frames between the initiator and target (which handle all exchanges themselves). However, because SATA drives do not utilize the concept of exchanges, the FAST switches in embodiments of the present invention are responsible for creating and terminating exchanges. The de-encapsulated SATA FISs are then communicated over a pure SATA connection 348 to the SATA drives 342.

Note that the front end devices 350 and the SAN 300 are not aware of the existence of the back end devices 338. For example, when host 330 sends SCSI data to a particular logical drive, it acts as a front-end initiator and sends the FC-encapsulated SCSI data to a virtual address associated with one of the ports 336 and a FC IOC controller 322 connected to that port 336, which acts as a front-end target. Unknown to the host 330, the processor 326 performing the RAID function identifies multiple addresses in multiple disk drive enclosures 332, and sends the SCSI data to one or more FAST IOCs 304, which act as back-end initiators. The FAST IOCs 304 translate the SCSI data into SATA FISs, encapsulate the SATA FISs into FC frames, and send the FC frames to those multiple addresses in multiple disk drive enclosures 332, which act as back-end targets. This process is referred to as virtualizing the storage. The processor 326 maintains the association between the virtual address and the addresses in the multiple disk drive enclosures, so that when a request to read that data is received from the host 330, the data can be pulled out of the multiple disk drive enclosures and sent back to the host 330.

The reverse of the above-described process is employed when a SATA drive 342 sends SATA FISs back to the host 330. Thus, when SATA FISs are to be sent from a SATA drive 342 to the RAID controller 320, the SATA FISs are sent over the SATA connection 348 to the FAST switch 340, where it is encapsulated in FC frames. The FAST switch 340 then transmits the FC frames over the FC link 346 to the RAID controller 320, where they are received by the FAST IOC 304. The FAST IOC 304 receives the FC frames, de-encapsulates the frames to retrieve the SATA FISs, and performs a SATA to SCSI translation 308 so that the RAID controller will see the target drive 342 as a SCSI device. The SCSI commands are sent to the processor 326 over PCI bus 328, which performs the RAID function and identifies the hosts (initiators) for which the SCSI data is destined. The SCSI data is then sent to the FC IOCs 322 over PCI bus 324, where they are encapsulated into FC frames and sent to the appropriate hosts over the fabric 318. The hosts then de-encapsulate the FC frames to retrieve the SCSI commands.

The benefit of performing the encapsulation/de-encapsulation and the SATA/SCSI translation in the FAST IOC 304 is that other than the addition of the FAST IOC 304, legacy RAID controllers 320 need not be changed to support SATA commands. Because the RAID function implemented by processor 326 has been extensively developed for FC drives implementing the SCSI protocol, embodiments of the present invention retain the FC link 346 between the RAID controller 320 and the multiple disk drive enclosures 332, even though the FC frames are now encapsulating SATA FISs. The conversion from FC to SATA is pushed down to the FAST switches 340 in the disk drive enclosures 332. However, in alternative embodiments, the conversion from SCSI to SATA could occur in the FAST IOCs 304 or even in the processor 326. In either case, the FAST IOCs 304 would then communicate SATA FISs to the disk drive enclosures 332 over a pure FC connection. In general, the SCSI/SATA translation and FAST encapsulation could occur anywhere on the initiator side of a FC link, while the FAST de-encapsulation/encapsulation could occur anywhere on the target side of the FC link.

A primary difference between SAS-SATA SANs described above and embodiments of the present invention is that in SAS-SATA SANs, there is a mixture of SATA FISs and SAS in the interconnect, while in the present invention, everything in the interconnect is FC. There are no SATA FISs, just FC frames with SATA FISs encapsulated within them.

In alternative embodiments of the present invention, a host may encapsulate SATA FISs in FC frames and pass these frames to a RAID controller, where the SATA FISs may either be de-encapsulated, virtualized and re-encapsulated into FC frames destined for multiple SATA drives in the back end, or simply passed through the RAID controller and sent directly to SATA drives through the FC network.

Figure 4:
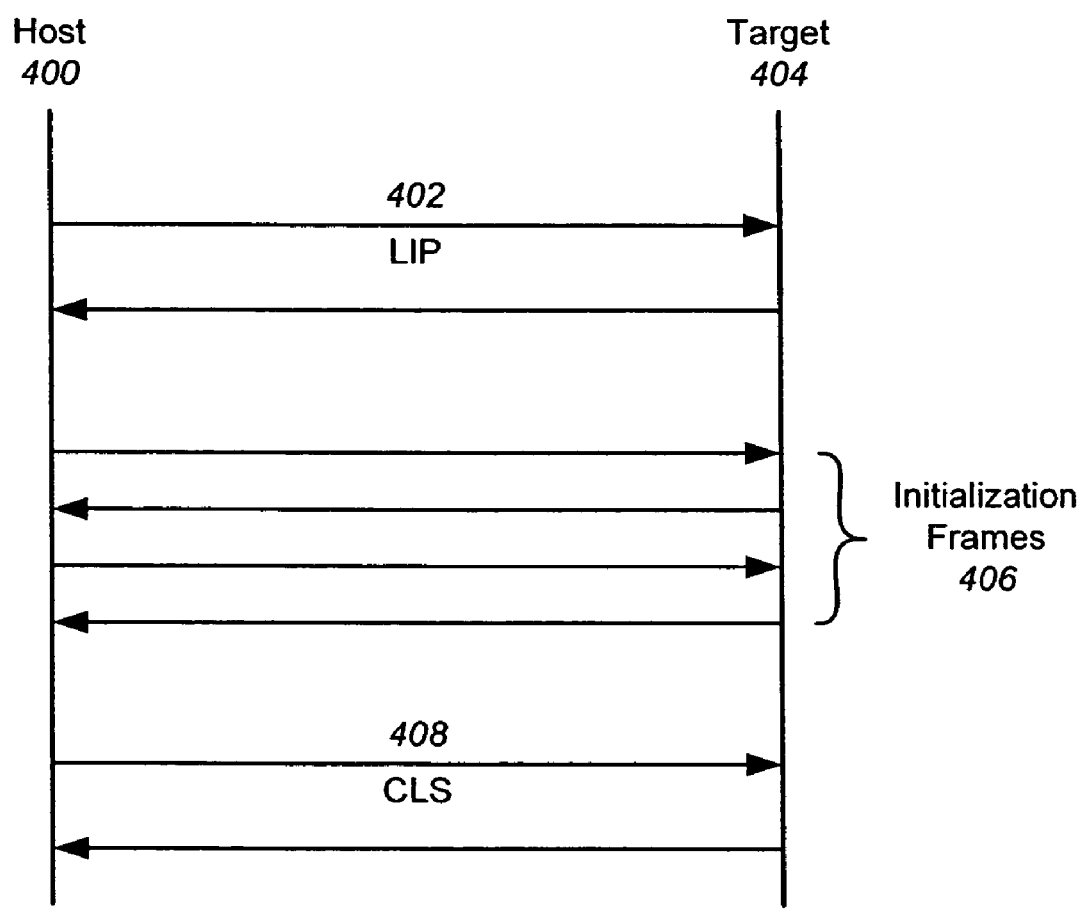
FIG. 4 is an exemplary illustration of a sequence or ladder diagram for a FC discovery process where LIP ordered sets are followed by a series of initialization frames and CLS ordered sets. This is a standard FC T-11 initialization sequence.

FC discovery. As illustrated in the sequence or ladder diagram of FIG. 4, a FC discovery process is started when a host or initiator 400 first sends a Loop Initialization Primitive (LIP) cycle ordered set 402 to a target 404, which then responds with further ordered sets. The LIPs are followed by a series of initialization frames 406, which are followed by a CLoSe (CLS) ordered set 408. At the conclusion of this process, all devices on the SAN know the addresses of all other devices on the SAN.

FIG. 5 illustrates a discovery sequence 500 between a FAST-compatible initiator 502 (e.g. a FAST IOC 304 in FIG. 3) and a FAST device 504 (e.g. disk drive enclosure 332 in FIG. 3) according to embodiments of the present invention. In FIG. 5, a N_Port LOGIn (PLOGI) frame 506 is sent from the initiator 502 to the device 504 to inquire about the basic capabilities of the device. When the device 504 returns a PLOGI accept frame 508, the initiator 502 will know the capabilities of the device, and know that the device is one with which the initiator can communicate. The initiator then sends a FC PRocess LogIn (PRLI) frame 510 to the device, requesting the characteristics of the device (i.e. what characteristics the device is capable of, is the device an initiator, a target, etc.). Because the device 504 in FIG. 5 is a FAST device and not a SCSI device, a FC PRLI reject frame 512 is returned to the initiator 502, indicating to the initiator that the device is not a SCSI device. The benefit of this indication is that non-FAST initiators will thereafter never send commands to the FAST device 504 or receive FC-encapsulated SATA FISs from the FAST device. If a FC PRLI reject frame 512 is received, initiators that are not FAST-compatible will not do anything further.

However, initiators 502 that are FAST-compatible will then send a FAST PRLI frame 514 to the device 504, requesting the FAST characteristics of the device. It should be understood that a capability within FC referred to as a vendor-unique field may be used to identify the FAST PRLI frame 504. In alternative embodiments, a command code may be assigned to the FAST PRLI frame 504 to make it a normal FC command. Because the device 504 is a FAST device, a FAST PRLI accept frame 516 will be returned to the initiator 502, indicating to the initiator that the device is a FAST device. At this point the initiator 502 knows that if FC frames are received from a target that returned a FC PRLI accept frame 512, the frames contain encapsulated SCSI commands, and if FC frames are received from a target that returned a FAST PRLI accept frame 516, the frames contain encapsulated SATA FISs. Note that each pair of frames in FIG. 5 are referred to as exchanges.

By way of comparison with SATA tunneling in SAS, the type of connection is detected is SAS during out-of-band signaling, and it is automatically configured to be either an STP or SAS interface. In SAS, the link is turned off for a period of time, and an envelope detector is used to determine periods of activity when data is being sent, and where there is inactivity, a few commands are sent, such as reinitialize (which is like a LIP in FC), wake up, power down, a signature frame is sent with device specific information, etc. This same out of band signaling is used in the embodiments of the present invention to initialize the SATA targets.

Exchange establishment. A FC exchange is a mechanism that two FC ports use to identify transactions between them. An N_Port may have multiple exchanges open simultaneously, allowing it to multiplex operations and take advantage of the periods of inactivity that occur when the other device is processing/retrieving information. For example, a RAID controller may have multiple front-end hosts asking for data. An initiator on the back end of the RAID controller (e.g. FAST IOC 304 in FIG. 3) may therefore need to request data from a number of different drives, all of which is destined for different hosts on the front end. To allow the initiator to efficiently process the response data and identify the host to which the response data is to be returned, an Originator eXchange IDentifier (OXID) is used. By looking at the OXID in the header of a FC frame being returned by a drive, the initiator knows which host to return the response data.

Figure 6:
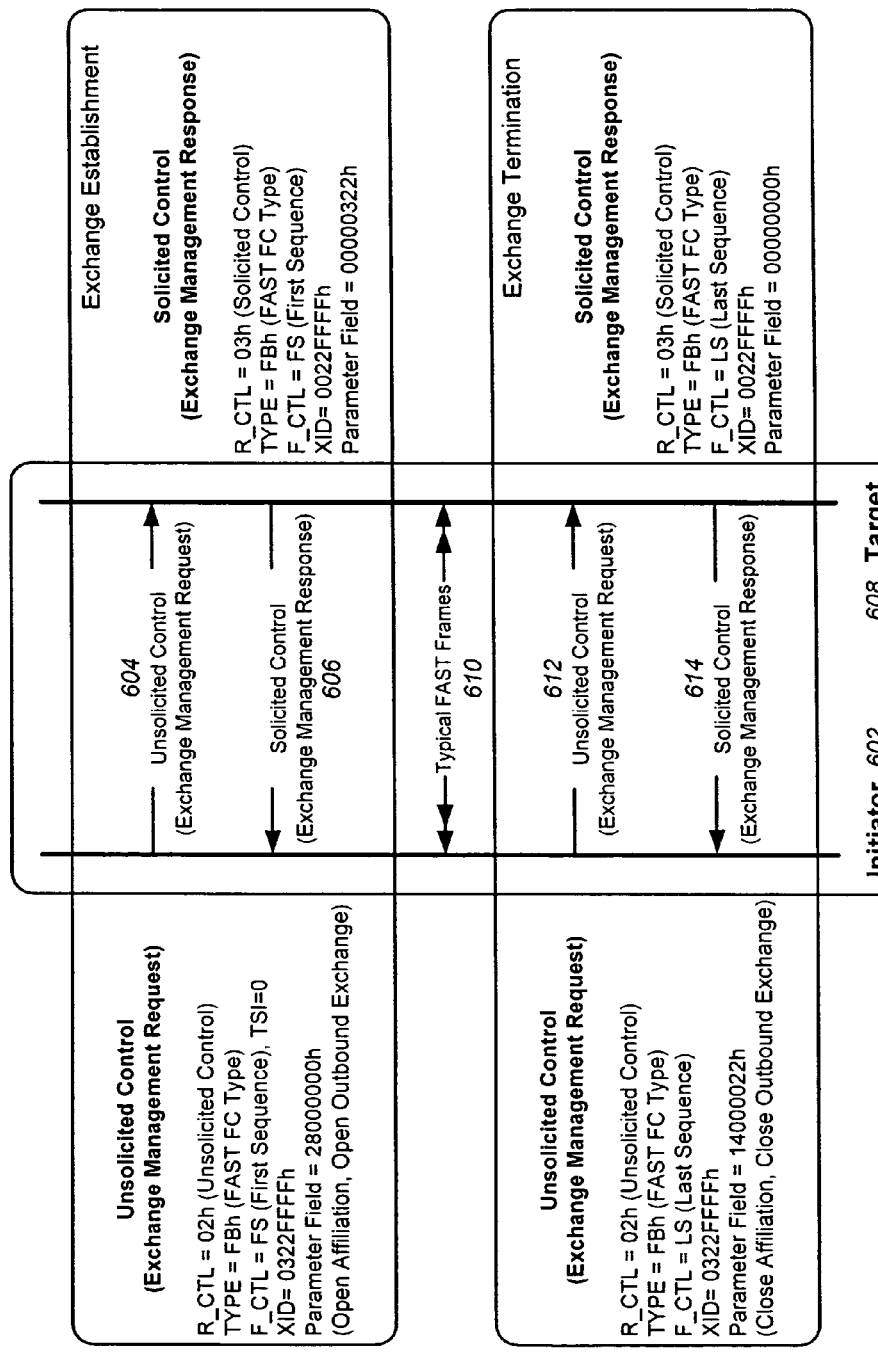
FIG. 6 is an exemplary illustration of exchange pair establishment and termination according to embodiments of the present invention.

FIG. 6 illustrates the establishment of an exchange 600 according to embodiments of the present invention. Dual exchanges are created to minimize the knowledge the switch must have about the protocol being tunneled. An unsolicited control frame 604 is first sent from the initiator 602. The OXID in the header of the unsolicited control frame 604 is the initiator's exchange ID. In the example of FIG. 6, the initiator's OXID is 0322FFFFh. This creates an outbound exchange for frames sent from the initiator to the target. In response, the FAST switch (not the drives) will respond with a solicited control frame 606 that sets up an exchange having a different OXID (e.g. 0022FFFFh in FIG. 6). This OXID creates a different path for the FAST switch to use in communicating with the initiator. In the payload field (see parameter field in FIG. 6), the FAST switch supplies the OXID that was received (0322FFFh), which links the two exchanges together as a pair.

While the dual exchanges are open, multiple SATA-encapsulated FC frames 610 can be passed between the initiator 602 and the target 608. To tear the exchange down, the initiator 602 sends another unsolicited control frame 612 which is an empty frame that has its "last of sequence bit" asserted in the header, and the FAST switch responds with a solicited control frame 614 acknowledging receipt of the last frame in the sequence. The FAST switch is also allowed to tear down the sequence on its own initiative by sending the solicited control frame 614 to the initiator 602 with "last of sequence bit" set. The initiator 602 will respond with an unsolicited control frame 612 with "last of sequence bit" set.

Figure 7:
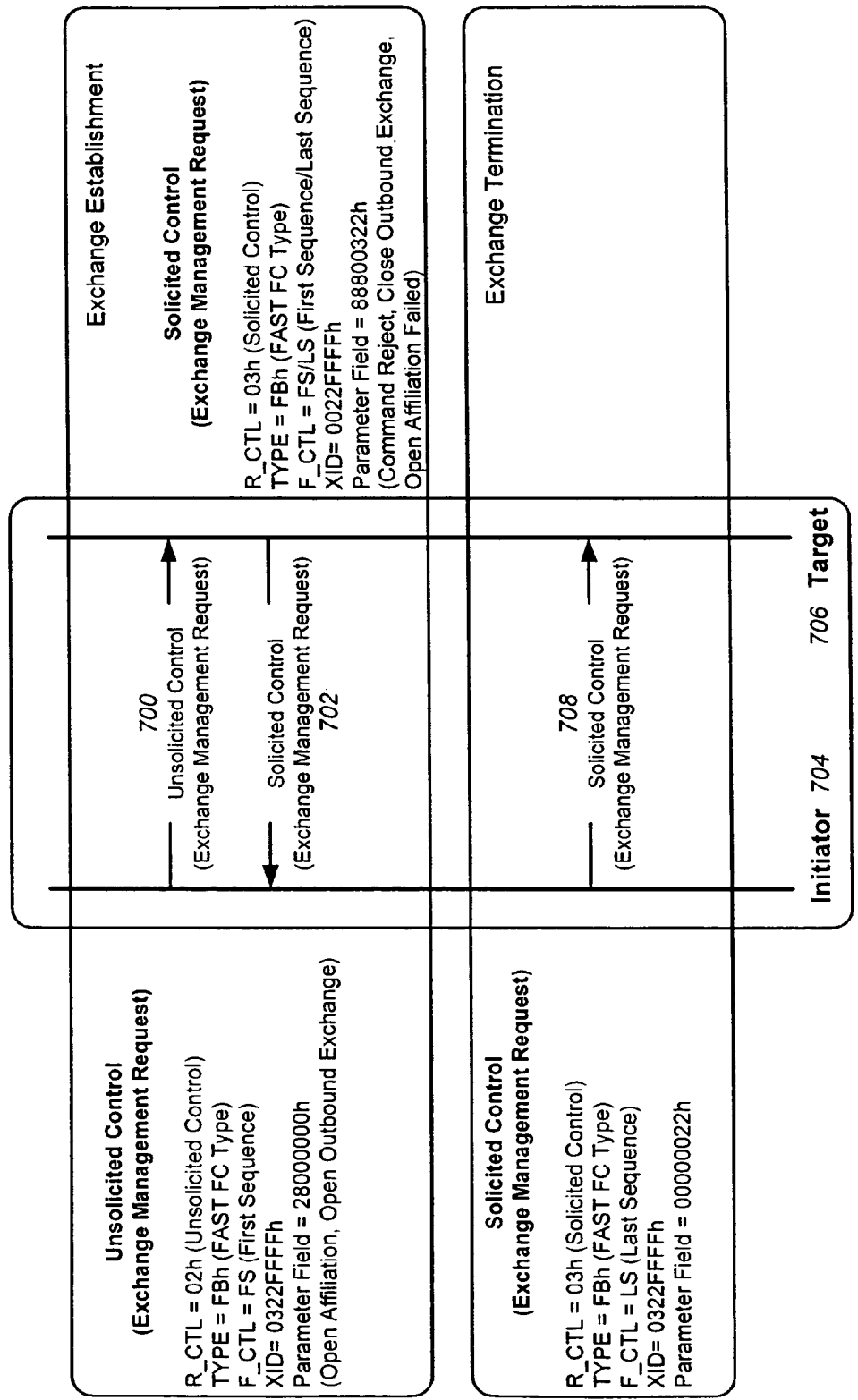
FIG. 7 is an exemplary illustration of exchange establishment rejection and termination according to embodiments of the present invention.

Referring now to FIG. 7, suppose an initiator 704 is communicating with a drive 706, and the initiator has created an exchange pair with the drive. Because SATA drives currently only accept a single outstanding I/O request at a time, other initiators may have outstanding I/O requests for that drive. If a second initiator wants to establish an exchange with drive 706, it will send the FAST switch associated with that drive an unsolicited control frame 700 with a unique OXID and a different source address. The FAST switch will respond with an unsolicited control connection reject 702, which closes the outbound exchange for the second initiator. This is an indication that the drive 706 is busy and already has an outstanding I/O request and an open exchange, so the second initiator cannot talk to that drive at the moment. The second initiator will then send a solicited control frame 708 acknowledging that the exchange is being closed.

Figure 8:
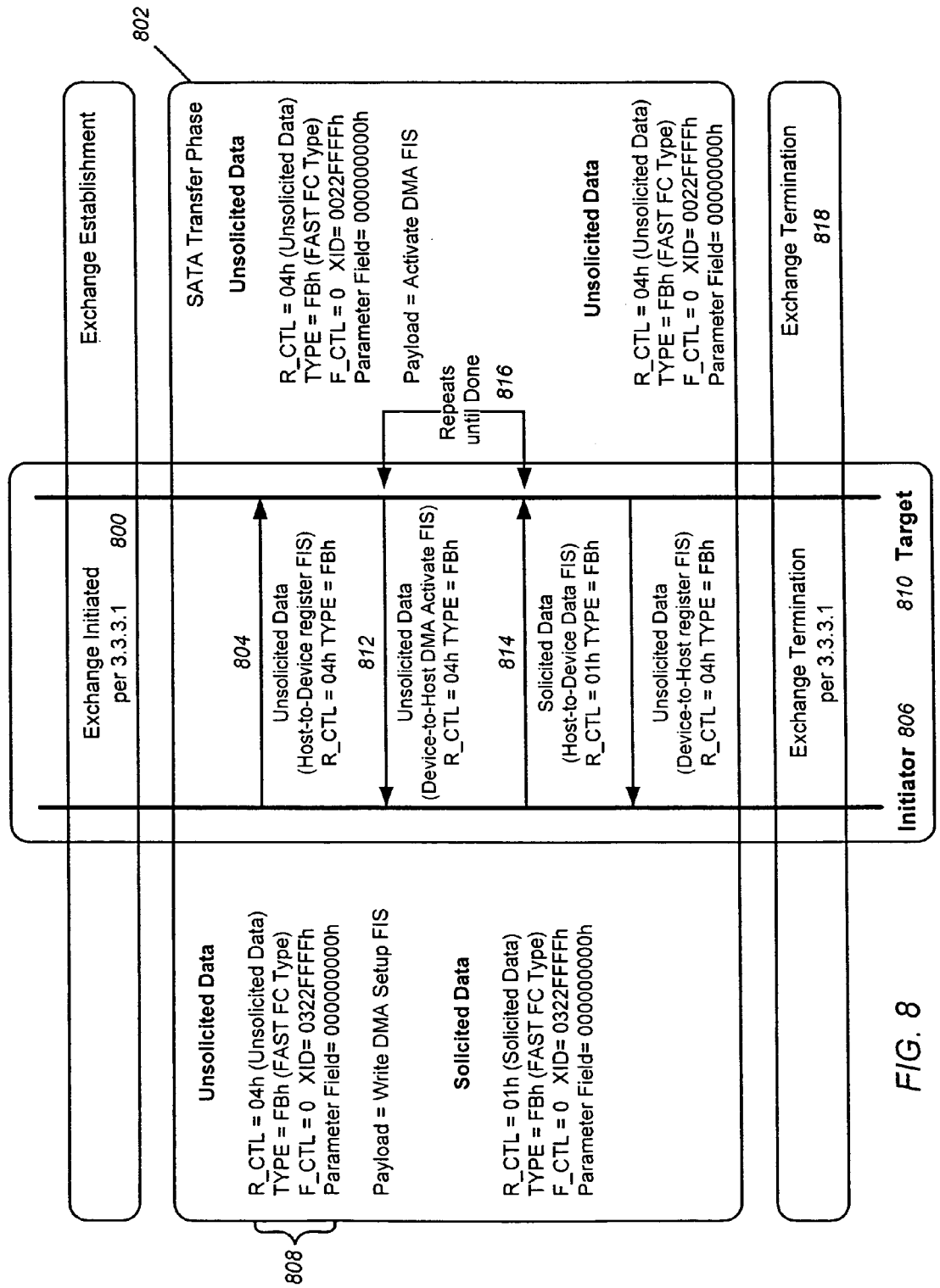
FIG. 8 is an exemplary illustration of how data is transferred according to embodiments of the present invention.

SATA FIS exchanges. FIG. 8 illustrates how data is transferred according to embodiments of the present invention. First, an exchange is established at 800 as described above. Next, a data transfer phase 802 is entered. An unsolicited data frame 804 is sent from the initiator 806 to a target device 810 with a vendor-specific frame type (e.g. FBh in the example of FIG. 8). The frame type indicates the type of traffic. Note that the Routing ConTroL (R_CTL), TYPE, Frame ConTroL (F_CTL) and Parameter fields 808 are information found in a FC frame header. R_CTL is comprised of control bits, and combined with the frame TYPE and the OXID, an initiator can quickly determine how to route and utilize the frame. Data transfer acceleration is possible because devices can look only at the header and determine what to do with the frame (e.g. routing the frame).

The unsolicited data frame 804 contains a host-to-device register FIS, which indicates to the drive whether the request is a read, write, request for status, and the like. The drives have a register interface, and this register is set differently, depending on whether it is a read, a write, a request for status, and the like. FIG. 8 illustrates the generic case where, after the unsolicited data frame 804 with a host-to-device register FIS is sent, the FAST switch responds with an unsolicited data frame 812 containing a device-to-host register FIS. Thereafter, solicited data is transferred at 814. Because the SATA drives are half-duplex, meaning that information can travel in only one direction at a time, a request-response interlock 816 is required multiple times until the data transfer is complete. After the last response is sent, exchange termination 818 is performed as described above.

Figure 9:
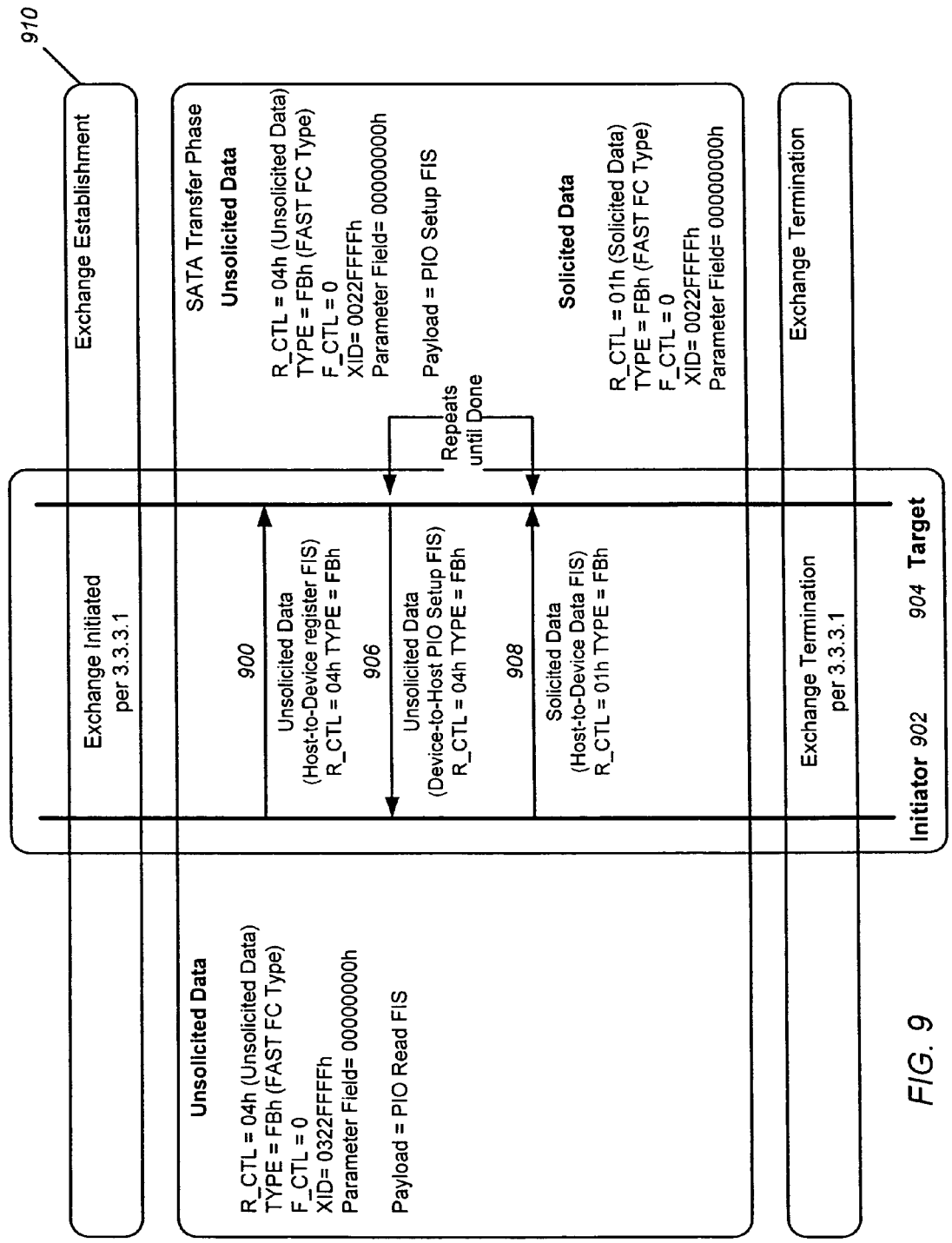
FIG. 9 is an exemplary illustration of a PIO read data transfer according to embodiments of the present invention.

FIG. 9 illustrates an exemplary Programmed Input/Output (PIO) read data transfer according to embodiments of the present invention. In FIG. 9, first, an exchange is established at 910 as described above. Next, an unsolicited data frame 900 containing a host-to-device register FIS is a request by the initiator 902 to perform a read operation in the target 904. The FAST switch sends back an unsolicited data frame 906 containing a device-to-host PIO setup FIS, which sets up the parameters in task file registers for the data transfer to follow. This is followed by solicited data 908. When all of the data has been transferred, the command is complete. After the last response is sent, exchange termination 912 is performed as described above.

Figure 10:
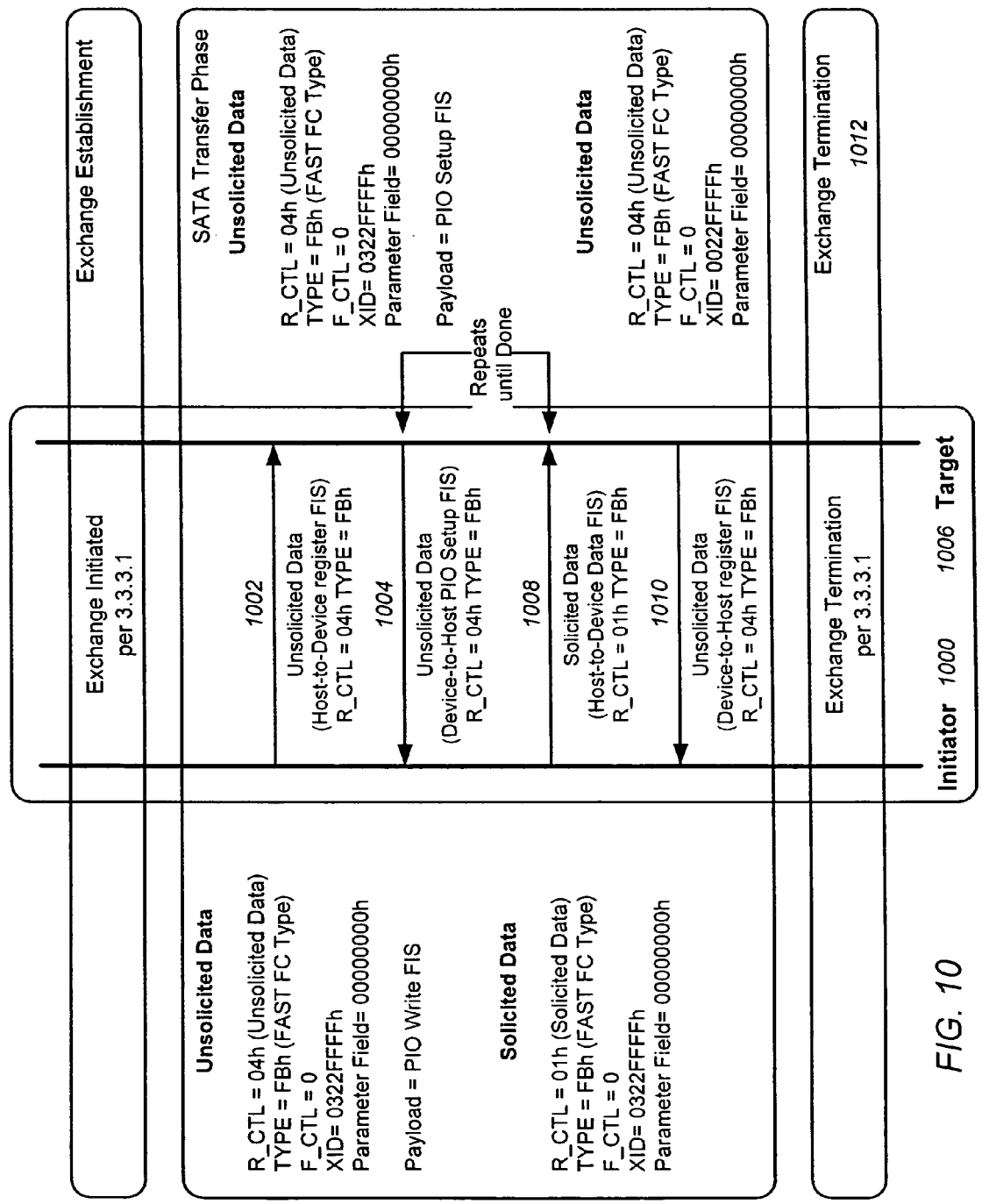
FIG. 10 is an exemplary illustration of a PIO write data transfer according to embodiments of the present invention.

FIG. 10 illustrates an exemplary PIO write data transfer according to embodiments of the present invention. In FIG. 10, first, an exchange is established at 10?? as described above. Next, the initiator 1000 sends an unsolicited data frame 1002 indicating an intention to perform a write, and the FAST switch responds with an unsolicited data frame 1004 indicating that permission is being given by the target 1006 to perform the write. The target 1000 then sends the first SATA FIS of data at 1008, and the drive responds at 1010 by indicating that the data was received. After the last data is received, the exchange is terminated at 1012.

Figure 11:
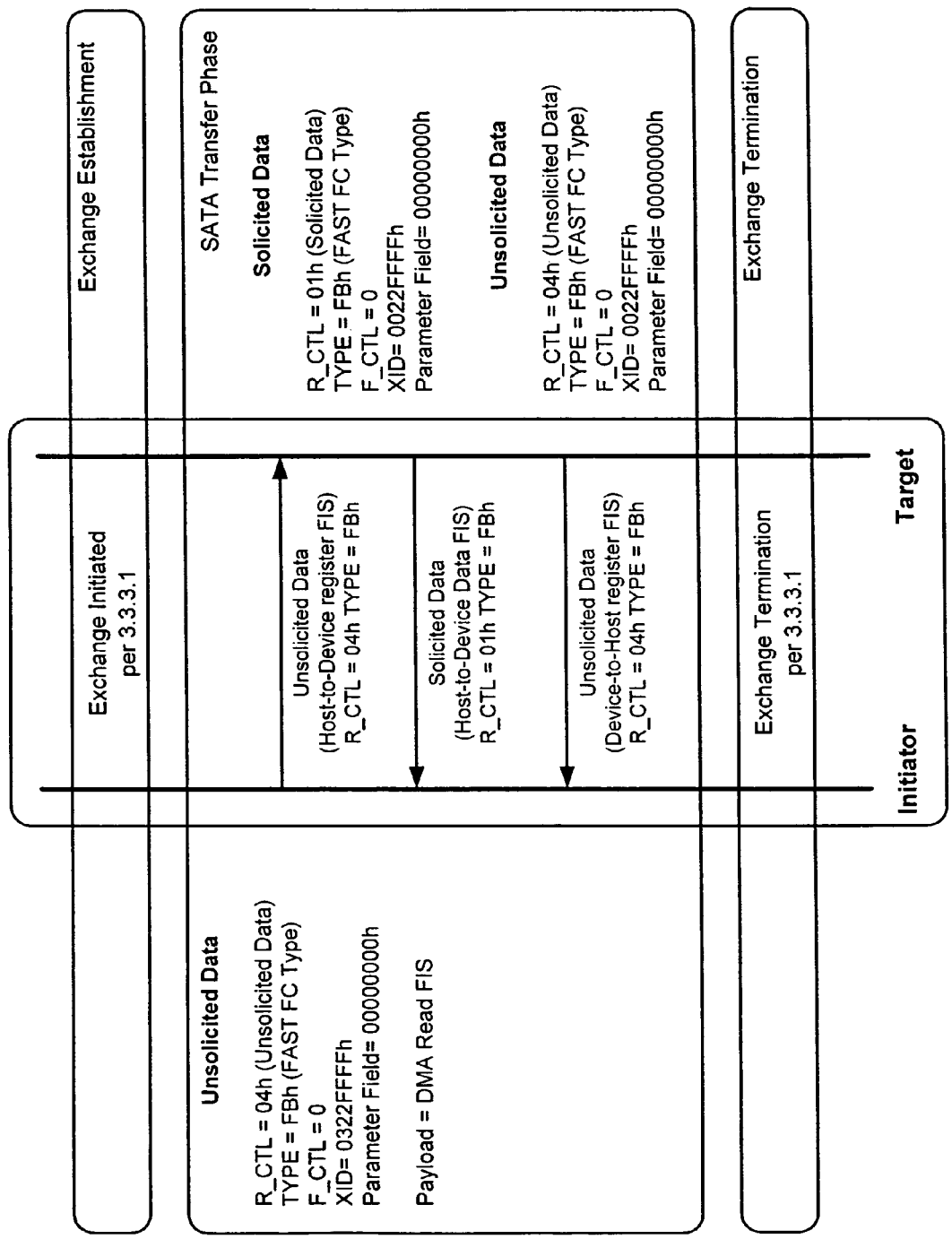
FIG. 11 is an exemplary illustration of a FAST DMA read data transfer according to embodiments of the present invention.
Figure 12:
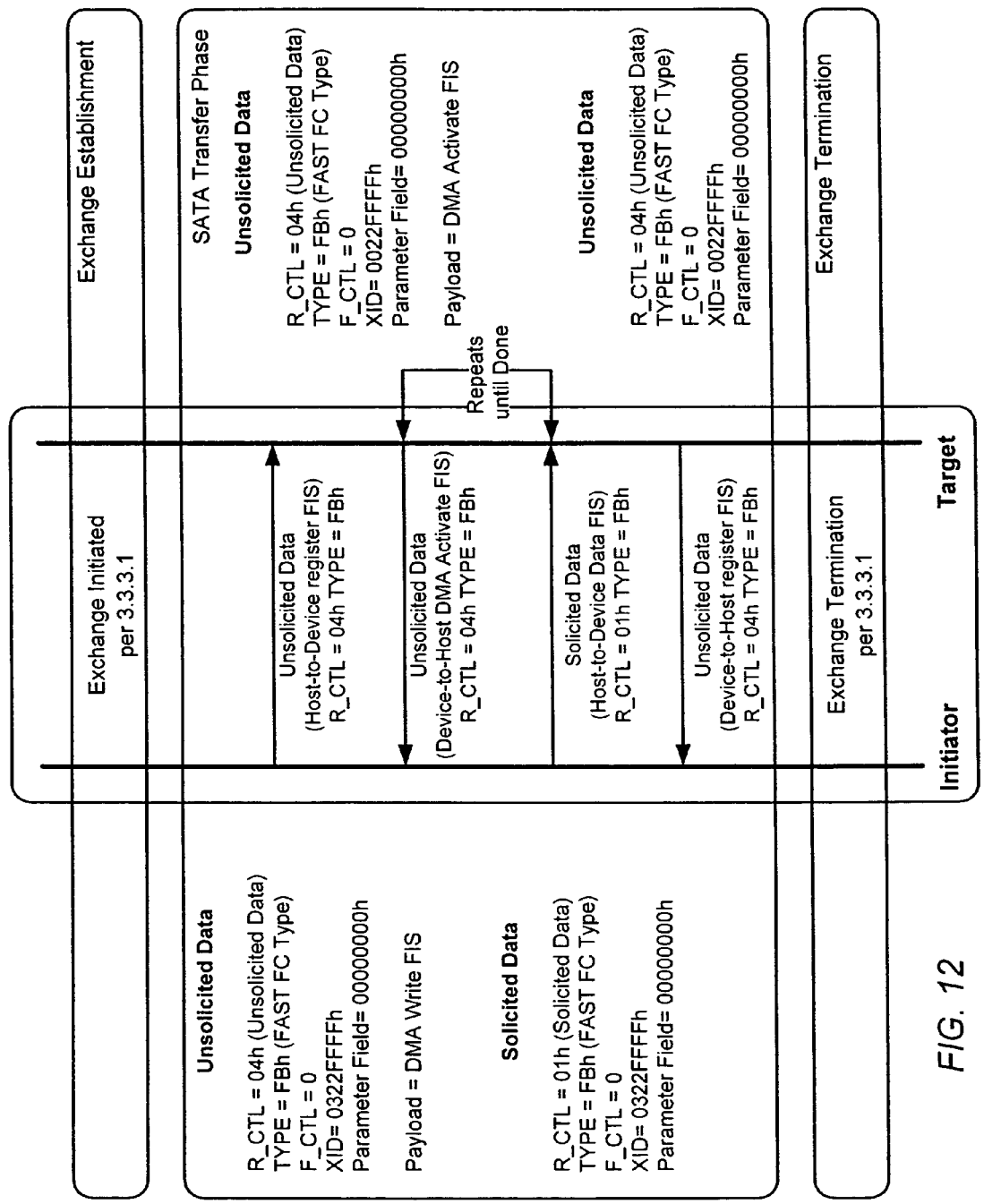
FIG. 12 is an exemplary illustration of a FAST DMA write data transfer according to embodiments of the present invention.
Figure 13:
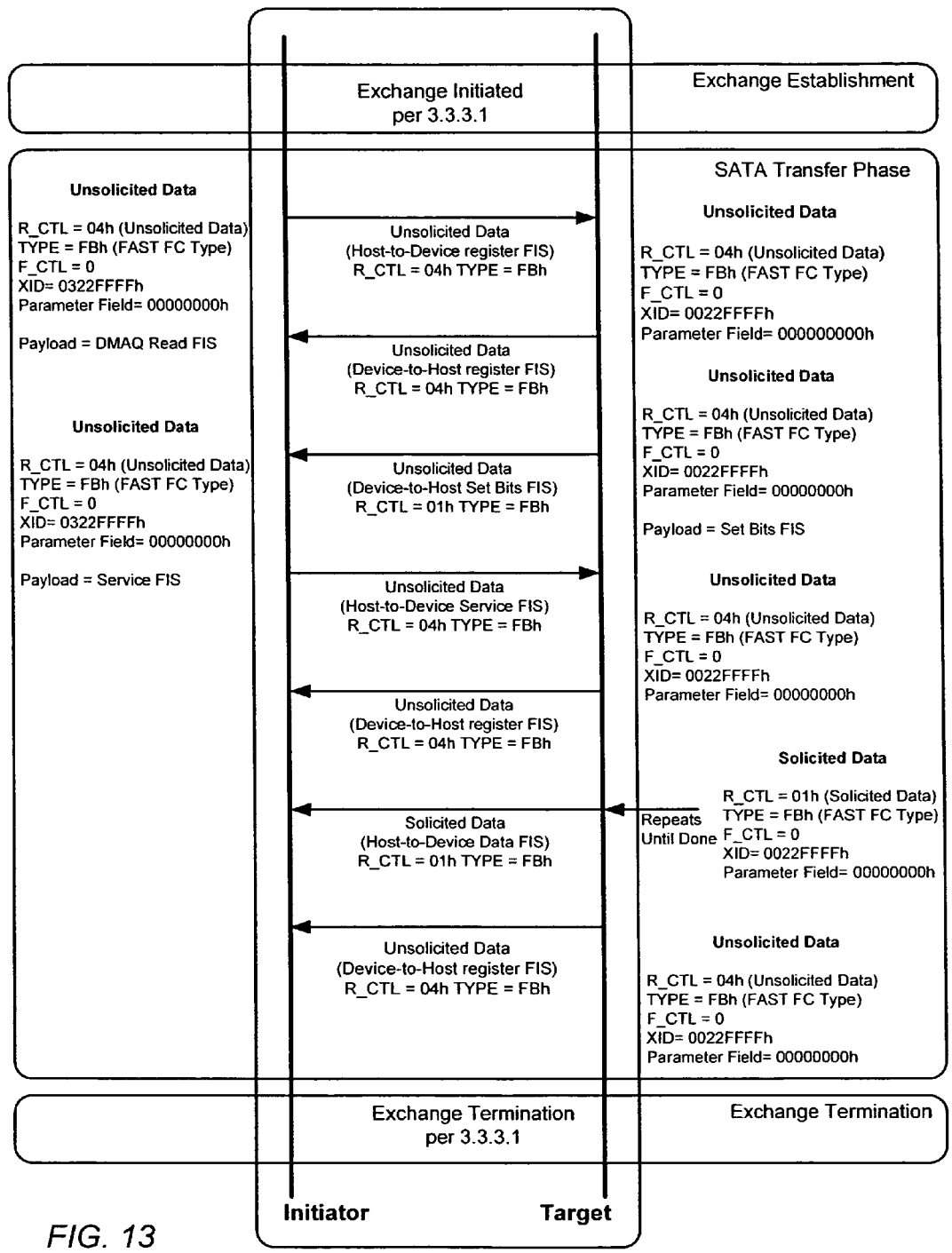
FIG. 13 is an exemplary illustration of a FAST DMAQ read data transfer according to embodiments of the present invention.
Figure 14:
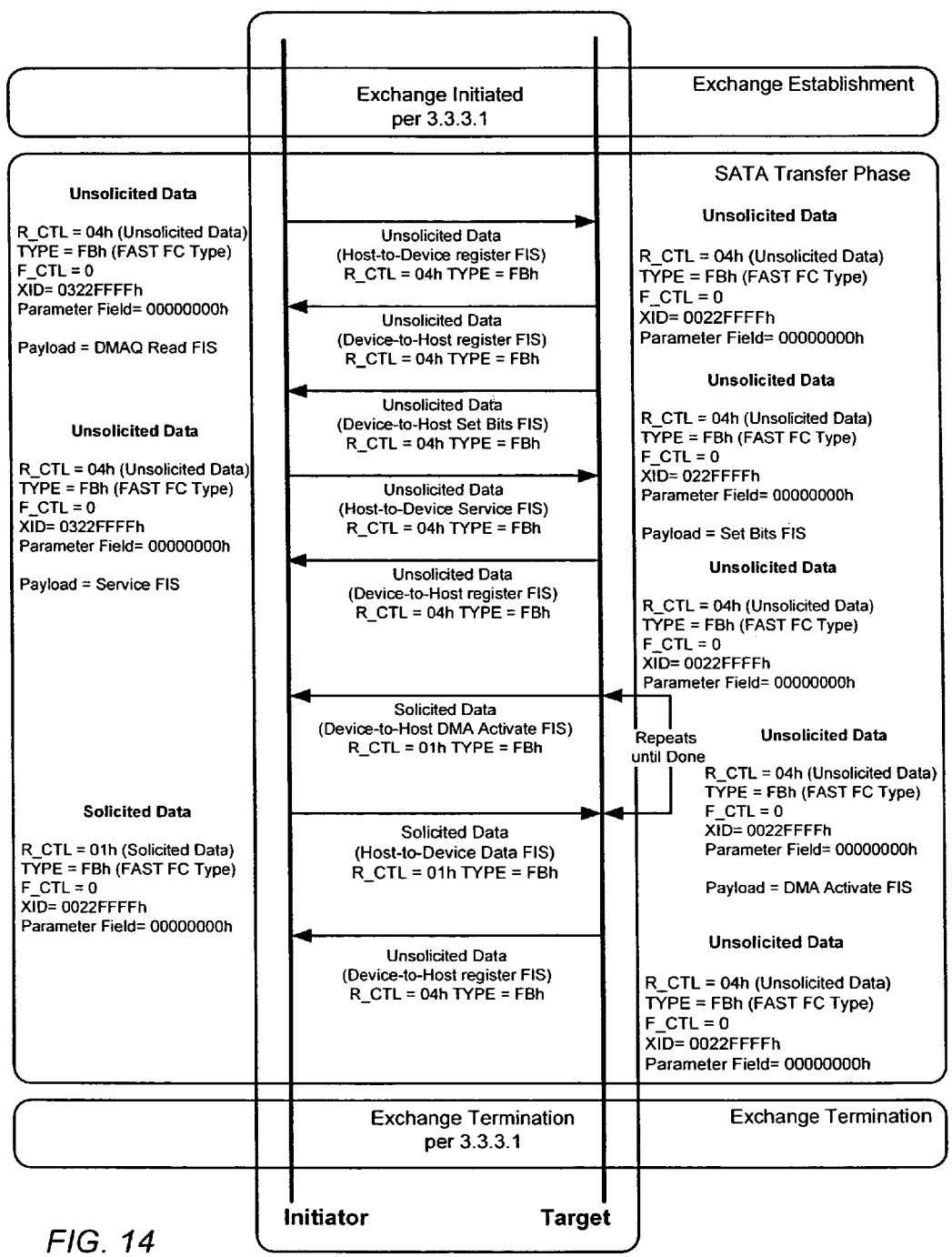
FIG. 14 is an exemplary illustration of a FAST DMAQ write data transfer according to embodiments of the present invention.

SATA provides a number of ways to perform read and write operations. One way is PIO. Another way is Direct Memory Access (DMA) (FIGS. 11 and 12), which is the most efficient way. Yet another way is Queued DMA (DMAQ) (FIGS. 13 and 14), which are FIS types 60 and 61 and are used with next generation SATA drives with native command queuing. DMAQ is an advanced form of DMA and represents another way SATA deals with reads and writes. All of the unsolicited data frames and solicited data frames are required to make it invisible to the FC network.

Frame definitions. As mentioned above, following initialization, the initiators will begin discovery of all devices in the configuration. This discovery begins with an N_Port login, or PLOGI, which is required by the standards. The PLOGI allows two N_Ports (the initiator and the target) to establish a session and exchange identities and service parameters. Table 1 shows the frame format of the PLOGI as well as the expected values for the fields. The values shown in the table are exemplary and for reference only. Note that the node name and port name are generated by the FAST switch using the switch serial number stored in an EEPROM and the port number of the SATA drive being emulated.

TABLE 1

| | | PLOGI Bits | | | |
|---|---|---|---|---|---|
| | Word | 31-24 | 23-16 | 15-8 | 7-0 |
| Header | 0 | R_CTL | | Destination DID | |
| | | 22 | | DD PPAA | |
| | 1 | CS_CTL | | Source SID | |
| | | 00 | | DD PPAA | |
| | 2 | Type | | F_CTL | |
| | | 01 | | 29 00 00 | |
| | 3 | SEQ_ID | DF_CTL | SEQ_CNT | |
| | | Incr | 00 | 00 00 | |
| | 4 | OX_ID | | RX_ID | |
| | | XX XX | | FF FF | |
| | 5 | PARAMETER | | | |
| | | 0000 0000 | | | |
| Payload | 0 | CMD | | x00 00 00 | |
| | | 03 | | 00 00 00 | |
| | 1 | Common Services Word 0 | | | |
| | | XX XX | | 00 00 | |
| | 2 | Common Services Word 1 | | | |
| | | 88 | 00 | 08 | 00 |
| | 3 | Common Services Word 2 | | | |
| | | 00 FF | | XX XX | |
| | 4 | Common Services Word 3 ED_TOV | | | |
| | | 00 00 07 D0 | | | |

TABLE 1-continued

| | PLOGI Bits | | | |
|---|---|---|---|---|
| Word | 31-24 | 23-16 | 15-8 | 7-0 |
| 5 | N_Port_Name | | | |
| | XX XX XX XX | | | |
| 6 | N_Port_Name | | | |
| | XX XX XX XX | | | |
| 7 | Node_Name | | | |
| | XX XX XX XX | | | |
| 8 | Node_Name | | | |
| | XX XX XX XX | | | |
| 9-12 | Class 1 Services Word 0-3 | | | |
| | 00 00 00 00 (4 Words) | | | |
| 13-16 | Class 2 Services Word 0-3 | | | |
| | 00 00 00 00 (4 Words) | | | |
| 17 | Class 3 Services Word 0 | | | |
| | 88 00 00 00 | | | |
| 18 | Class 3 Services Word 1 | | | |
| | 00 00 08 00 | | | |
| 19 | Class 3 Services Word 2 | | | |
| | 00 FF 00 00 | | | |
| 20 | Class 3 Services Word 3 | | | |
| | 00 01 00 00 | | | |
| 21-24 | Class 4 Services Word 0-3 | | | |
| | 00 00 00 00 (4 Words) | | | |
| 25-28 | Vendor Version Level Word 0-3 | | | |
| | 00 00 00 00 (4 Words) | | | |
| | CRC | | | |
| | Calculated | | | |

For PLOGI accept frames from targets to initiators, note that the following table shows the PLOGI response to a PLOGI. XX in Table 2 below is used for undefined. entries per the FC standard. Those items listed as "Same as PLOGI" will use the same value provided in the PLOGI.

TABLE 2

| | | PLOGI_ACC Bits | | | |
|---|---|---|---|---|---|
| | Word | 31-24 | 23-16 | 15-8 | 7-0 |
| Header | 0 | R_CTL | | Destination DID | |
| | | 23 | | SRC of PRLI | |
| | 1 | CS_CTL | | Source SID | |
| | | 00 | | Dest of PRLI | |
| | 2 | Type | | F_CTL | |
| | | 01 | | 98 00 00 | |
| | 3 | SEQ_ID | DF_CTL | SEQ_CNT | |
| | | Incr | 00 | 0000 | |
| | 4 | OX_ID | | RX_ID | |
| | | Same as PLOGI | | Same as PLOGI | |
| | 5 | PARAMETER | | | |
| | | 0000 0000 | | | |
| Payload | 0 | CMD | | x00 00 00 | |
| | | 02 | | 00 00 00 | |
| | 1 | Common Services Word 0 | | | |
| | | XX XX | | 00 00 | |
| | 2 | Common Services Word 1 | | | |
| | | 88 | 00 | 08 | 00 |
| | 3 | Common Services Word 2 | | | |
| | | 00 FF | | XX XX | |
| | 4 | Common Services Word 3 ED_TOV = PLOGI | | | |
| | | Value | | | |
| | 5 | N_Port_Name | | | |
| | | Must be Unique for demo. | | | |
| | 6 | N_Port_Name | | | |
| | | Must be Unique for demo. | | | |
| | 7 | Node_Name | | | |
| | | Must be Unique for demo. | | | |
| | 8 | Node_Name | | | |
| | | Must be Unique for demo. | | | |
| | 9-12 | Class 1 Services Word 0 | | | |
| | | 00 00 00 00 (4 Words) | | | |
| | 13-16 | Class 2 Services Word 1 | | | |

TABLE 2-continued

| | | PLOGI_ACC Bits | | |
|---|---|---|---|---|
| Word | 31-24 | 23-16 | 15-8 | 7-0 |
| | | 00 00 00 00 (4 Words) | | |
| 17 | | Class 3 Services Word 0 | | |
| | | 80 00 00 00 | | |
| 18 | | Class 3 Services Word 1 | | |
| | | 00 00 08 00 | | |
| 19 | | Class 3 Services Word 2 | | |
| | | 00 FF 00 00 | | |
| 20 | | Class 3 Services Word 3 | | |
| | | 00 01 00 00 | | |
| 21-24 | | Class 4 Services Word 0 | | |
| | | 00 00 00 00 (4 Words) | | |
| 25-28 | | Vendor Version Level Word 0-3 | | |
| | | 00 00 00 00 (4 Words) | | |
| | | CRC | | |
| | | Calculated | | |

For PRLI (FCP-2) frames from initiators to targets, note that the PRLI is second phase of discovery. The process login is used to establish and manage a session between the initiator and target. The PRLI contains the service parameters to be used for the communication. See Table 3 below.

TABLE 3

| | | FCP-2 PRLI Bits | | | |
|---|---|---|---|---|---|
| | Word | 31-24 | 23-16 | 15-8 | 7-0 |
| Header | 0 | R_CTL | Destination DID | | |
| | | 22 | DD PPAA | | |
| | 1 | CS_CTL | Source SID | | |
| | | 00 | DD PPAA | | |
| | 2 | Type | F_CTL | | |
| | | 01 | 29 00 00 | | |
| | 3 | SEQ_ID | DF_CTL | SEQ_CNT | |
| | | XX | 00 | 00 00 | |
| | 4 | OX_ID | | RX_ID | |
| | | XX XX | | FF FF | |
| | 5 | PARAMETER | | | |
| | | 0000 0000 | | | |
| Payload | 0 | CMD | Pge Len | Payload Length | |
| | | 20 | 10 | Calculated | |
| | 1 | Service Parameter Page W 0 | | | |
| | | 08 RR | | 20 00 | |
| | 2 | Service Parameter Page W 1 | | | |
| | | 00 00 00 00 | | | |
| | 3 | Service Parameter Page W 2 | | | |
| | | 00 00 00 00 | | | |
| | 4 | Service Parameter Page W 3 | | | |
| | | 00 00 03 A2 | | | |
| | | CRC | | | |
| | | Calculated | | | |

For PRLI_Reject (FCP-2) frames from targets to initiators, note that because Non-FAST IOCs may be connected to FAST based enclosures, it is important to provide a mechanism to stop the non-FAST IOC from attempting to repeatedly communicate with the FAST targets. When the non-FAST IOC receives a Link Service ReJecT (LS_RJT) in response to the PRLI, the device will not be logged into the target and then not communicate with the target. See Table 4 below.

TABLE 4

| | | FCP-2 PRLI Bits | | | |
|---|---|---|---|---|---|
| | Word | 31-24 | 23-16 | 15-8 | 7-0 |
| Header | 0 | R_CTL | Destination DID | | |
| | | 23 | SRC of PRLI | | |
| | 1 | CS_CTL | Source SID | | |
| | | 00 | Dest of PRLI | | |
| | 2 | Type | F_CTL | | |
| | | 01 | 00 00 00 | | |
| | 3 | SEQ_ID | DF_CTL | SEQ_CNT | |
| | | FF | 00 | 00 00 | |
| | 4 | OX_ID | | RX_ID | |
| | | Same as PRLI | | Same as PRLI | |
| | 5 | PARAMETER | | | |
| | | 0000 0000 | | | |
| Payload | 0 | LS_Command Code | | | |
| | | 01 00 00 00 | | | |
| | 1 | Services Reject Data Def | | | |
| | | 00 | 0B | 00 | 00 |
| | 2 | CRC | | | |
| | | Calculated | | | |

For PRLI (FAST) frames from initiators to targets, note that when a FAST IOC receives the FC-4 PRLI LS_RJT, it will initiate a FAST PRLI to determine if the device is in fact a SATA device that is capable of FAST. This frame is modeled from the FC PRLI and contains all the same fields. The significant differences in the frame are the change of the type code to the FAST type code and the change of the service parameter to FAST. See Table 5 below.

TABLE 5

| | | FCP-2 PRLI bits | | | |
|---|---|---|---|---|---|
| | Word | 31-24 | 23-16 | 15-8 | 7-0 |
| Header | 0 | R_CTL | Destination DID | | |
| | | 22 | DD PPAA | | |
| | 1 | CS_CTL | Source SID | | |
| | | 00 | DD PPAA | | |
| | 2 | Type | F_CTL | | |
| | | 01 | 29 00 00 | | |
| | 3 | SEQ_ID | DF_CTL | SEQ_CNT | |
| | | XX | 00 | 00 00 | |
| | 4 | OX_ID | | RX_ID | |
| | | XX XX | | FF FF | |
| | 5 | PARAMETER | | | |
| | | 0000 0000 | | | |
| Payload | 0 | CMD | Pge Len | Payload Length | |
| | | 20 | 10 | Calculated | |
| | 1 | Service Parameter Page W 0 | | | |
| | | FB RR 20 00 | | | |
| | 2 | Service Parameter Page W 1 | | | |
| | | 00 00 00 00 | | | |
| | 3 | Service Parameter Page W 2 | | | |
| | | 00 00 00 00 | | | |
| | 4 | Service Parameter Page W 3 | | | |
| | | 00 00 00 22 | | | |
| | 5 | CRC | | | |
| | | Calculated | | | |

The service parameter page for FAST PRLI and Response is as follows in Table 6 below.

TABLE 6

| FCP service parameter | Word | Bit |
|---|---|---|
| Reserved | 0 | 31-0 |
| Reserved | 1 | 31-0 |
| Reserved | 2 | 31-0 |
| Reserved | 3 | 31-6 |

TABLE 6-continued

| FCP service parameter | Word | Bit |
|---|---|---|
| Initiator Function | 3 | 5 |
| Target Function | 3 | 4 |
| Reserved | 3 | 3-0 |

For PRLI_Accept (FAST) frames from targets to initiators, note that the FAST PRLI accept is also modeled after the PRLI accept. This frame indicates to the Host that the attached storage is a SATA drive connected to a FAST capable switch. See Table 7 below.

TABLE 7

| | | FCP-2 PRLI bits | | |
|---|---|---|---|---|
| | Word | 31-24 | 23-16 | 15-8 | 7-0 |
| Header | 0 | R_CTL 23 | Destination DID Source of FAST PRLI | | |
| | 1 | CS_CTL 00 | Source SID Dest of FAST PRLI | | |
| | 2 | Type 01 | F_CTL 00 00 00 | | |
| | 3 | SEQ_ID FF | DF_CTL 00 | SEQ_CNT 00 00 | |
| | 4 | OX_ID Same as PRLI | | RX_ID Same as PRLI | |
| | 5 | PARAMETER 00 00 00 00 | | | |
| Payload | 0 | CMD 02 | Pge Len 10 | Payload Length 00 2C | |
| | 1 | Service Parameter Page W 0 FB RR 21 00 | | | |
| | 2 | Service Parameter Page W 1 00 00 00 00 | | | |
| | 3 | Service Parameter Page W 2 00 00 00 00 | | | |
| | 4 | Service Parameter Page W 3 00 00 00 12 | | | |
| | 5 | CRC Calculated | | | |

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for enabling Serial Advanced Technology Attachment (SATA) disk drives to be utilized in Fibre Channel (FC) Storage Area Networks (SANs), comprising:
at an initiator side of a FC link, integrating a translation module and a SATA encapsulation and/or de-capsulation module in a controller, the translation module configured for translating Small Computer System Interconnect (SCSI) commands to SATA Frame Information Structures (FISs) and the SATA encapsulation and/or de-capsulation module configured for encapsulating the SATA FISs into FC frames for commands being sent to the SATA disk drives, wherein the controller is configured to, for all FC frames received from the FC link, distinguish the FC frames that contain SCSI commands from the FC frames that encapsulate SATA FISs, the controller further configured for de-encapsulating the SATA FISs from the FC frames that encapsulate SATA FISs and translating the SATA FISs to SCSI commands for commands being received from the SATA disk drives, and performing low-level FC protocol handling for the FC frames that contain SCSI commands; and
at a target side of the FC link, integrating another SATA encapsulation and/or de-capsulation module in a switch, wherein the switch is configured to, for all FC frames received from the FC link, distinguish the FC frames that contain SCSI commands from the FC frames that encapsulate SATA FISs, the switch further configured for de-encapsulating the FC frames that encapsulate SATA FISs to retrieve the SATA FISs and sending the SATA FISs to the SATA disk drives for commands being sent to the SATA disk drives, and performing low-level FC protocol handling for the FC frames that contain SCSI commands, and wherein the switch is further configured for receiving the SATA FISs from the SATA disk drives and encapsulating the SATA FISs into FC frames for commands being sent from the SATA disk drives.

2. The method as recited in claim 1, further comprising:
at the initiator side of a FC link, identifying one or more destination addresses for the SCSI commands prior to communicating the FC frames over the FC link for commands being sent to the SATA disk drives, and identifying one or more initiator addresses for commands being received from the SATA disk drives.

3. The method as recited in claim 1, further comprising translating between the SCSI commands and the SATA FISs in a back end of a Redundant Array of Independent Disks (RAID) controller.

4. The method as recited in claim 1, further comprising encapsulating the SATA FISs within the FC frames or de-encapsulating the SATA FISs from the FC frames in a disk drive enclosure containing the SATA disk drives.

5. The method as recited in claim 1, further comprising:
within a host, encapsulating the SCSI commands within FC frames for commands being sent to the SATA disk drives, and de-encapsulating the SCSI commands from FC frames for commands being received from the SATA disk drives;
communicating the FC frames over a FC fabric to the initiator side of the FC link; and
at the initiator side of the FC link, de-encapsulating the SCSI commands from the FC frames for commands being sent to the SATA disk drives, and encapsulating the SCSI commands in FC frames for commands being received from the SATA disk drives.

6. A system for enabling Serial Advanced Technology Attachment (SATA) disk drives to be utilized in Fibre Channel (FC) Storage Area Networks (SANs), comprising:
a FC link;
an initiator coupled to the FC link, the initiator comprising a controller that integrates a translation module for translating Small Computer System Interconnect (SCSI) commands to SATA Frame Information Structures (FISs) and a SATA encapsulation and/or de-capsulation module for encapsulating the SATA FISs into FC frames when sending commands to the SATA disk drives over the FC link, wherein the controller is configured to distinguish the FC frames that contain SCSI commands from the FC frames that encapsulate SATA FISs, the controller further configured for de-encapsulating the SATA FISs from the FC frames that encapsulate SATA FISs and translating the SATA FISs to SCSI commands when receiving commands from the SATA disk drives, and performing low-level FC protocol handling for the FC frames detected to be encapsulating SCSI commands; and a target coupled to the FC link, the target comprising a switch that integrates another SATA encapsulation and/or de-capsulation module, wherein the target is configured to distinguish the FC frames that contain SCSI commands from the FC frames that encapsulate SATA FISs, the target further configured for de-encapsulating the FC frames that encapsulate SATA FISs to retrieve the SATA FISs and sending the SATA FISs to the SATA disk drives when receiving commands from the initiator, and performing low-level FC protocol handling for the FC frames that contain SCSI commands, and wherein the switch is further configured for receiving the SATA FISs from the SATA disk drives and encapsulating the SATA FISs into FC frames when sending commands to the initiator.

7. The system as recited in claim 6, further comprising a host coupled to initiator via a FC fabric for encapsulating the SCSI commands within FC frames for commands being sent to the SATA disk drives, and de-encapsulating the SCSI commands from FC frames for commands being received from the SATA disk drives;

the initiator for de-encapsulating the SCSI commands from the FC frames for commands being sent to the SATA disk drives, and encapsulating the SCSI commands in FC frames for commands being received from the SATA disk drives.

8. The system as recited in claim 6, further comprising:

a processor at the initiator side of the FC link for performing a Redundant Array of Independent Disks (RAID) function and identifying one or more destination addresses for the SCSI commands for commands being sent to the SATA disk drives, and identifying one or more initiator addresses for commands being received from the SATA disk drives.

9. The system as recited in claim 6, wherein the initiator comprises a Fibre Channel (FC) Attached Serial Advanced Technology Attachment (SATA) Tunneling (FAST) Input/Output Controller (IOC).

10. The system as recited in claim 6, wherein the target comprises a Fibre Channel (FC) Attached Serial Advanced Technology Attachment (SATA) Tunneling (FAST) switch.

11. The system as recited in claim 9, further comprising a Redundant Array of Independent Disks (RAID) controller at the initiator side of the FC link, the RAID controller including the FAST IOC in a back end of the RAID controller.

12. The system as recited in claim 10, further comprising a disk drive enclosure at the target side of the FC link, the disk drive enclosure including the FAST switch.

* * * * *